United States Patent [19]

Patel

[11] Patent Number: 5,399,548
[45] Date of Patent: Mar. 21, 1995

[54] BLENDED DRILLING FLUID THINNER

[75] Inventor: Bharat B. Patel, Bartlesville, Okla.

[73] Assignee: Phillips Petroleum Company, Bartlesville, Okla.

[21] Appl. No.: 976,818

[22] Filed: Nov. 16, 1992

[51] Int. Cl.$^6$ .......................... C09K 7/02; E21B 43/16
[52] U.S. Cl. ..................... 507/109; 507/107; 507/108; 507/119; 507/206; 507/207; 507/208; 507/224; 507/925
[58] Field of Search ....... 507/109; 252/8.551

[56] References Cited

U.S. PATENT DOCUMENTS

| | | | |
|---|---|---|---|
| 2,911,365 | 11/1959 | Burland et al. | 252/8.5 C |
| 2,923,681 | 2/1960 | Hein et al. | 252/8.5 |
| 4,013,568 | 3/1977 | Fischer et al. | 252/8.5 C |
| 4,118,441 | 10/1978 | Le Blanc | 260/874 |
| 4,341,645 | 7/1982 | Blattel et al. | 252/8.5 C |
| 4,476,029 | 10/1984 | Sy et al. | 252/8.5 C |
| 4,572,789 | 2/1986 | Uemura et al. | 252/8.5 A |
| 4,618,433 | 10/1986 | Allison, III | 252/8.514 |
| 4,678,591 | 7/1987 | Giddings et al. | 252/8.514 |
| 4,704,214 | 11/1987 | Russell et al. | 252/8.514 |
| 4,842,770 | 6/1989 | Patel | 252/8.514 |
| 4,946,605 | 8/1990 | Farrar et al. | 252/8.514 |

OTHER PUBLICATIONS

Gray et al "Composition and Properties of Oil Well Drilling Fluids" Gulf Publishing Co, Houston, 1980, pp. 564–567; 570–576.

*Primary Examiner*—Gary Geist
*Attorney, Agent, or Firm*—Richmond, Phillips, Hitchcock & Fish

[57] ABSTRACT

A blended additive composition, which is useful for thinning aqueous drilling fluids, is disclosed. The composition includes a first component selected from the group including: a modified tannin, a modified lignite and sodium lignosulfonate; a second component being a polymer prepared from acrylic acid; and a third component being a metal compound selected from the group of metals including iron, tin, chromium, manganese, titanium, aluminum and zinc.

21 Claims, No Drawings

BLENDED DRILLING FLUID THINNER

FIELD OF THE INVENTION

This invention relates to drilling and servicing of wells drilled into fluid producing formations. In one aspect this invention relates to drilling, completion, and workover fluid additives which impart an improved thinning effect to the fluids. In another aspect this invention relates to blending starting materials comprising drilling, completion, and workover fluid additives having different thinning properties and inorganic compounds to produce a blended product having thinning properties which surpass the properties of the starting components.

BACKGROUND OF THE INVENTION

Drilling fluids perform a variety of functions that influence the drilling rate, the cost and safety of a well drilling operation. The drilling fluid, or so called mud, is pumped down a hollow drill string, through nozzles in the bit at the bottom, and then up the annulus formed by the hole or casing and the drill string to the surface. The bit is turned by rotating the entire string from the surface or by using a downhole motor. Circulation of the drilling fluid in this manner removes the cuttings from the bore hole, lubricates and cools the drill bit, seals the wall of the bore hole with a thin impervious layer and applies a hydrostatic head to the formation to counterbalance formation pressures. After reaching the surface, the drilling fluid is passed through a series of screens, settling tanks or other equipment to remove formation material brought to the surface. It is then treated with additives to obtain a desired set of properties. Once treated the fluid is pumped back into the well and the cycle repeated.

Most drilling, completion and workover fluids are complex mixtures of interacting chemical compounds and their properties change remarkably with changes in temperature, shear rate and shear history. As drilling fluids circulate through the bore hole they are subjected to ever changing conditions such as turbulent flow in the drill pipe, intense shearing at the bit, and nominal laminar flow in the annulus.

Accordingly one of the most desirable characteristics of drilling fluids as a class of material is versatility which can be achieved by foresighted treatment with carefully selective additives. A variety of drilling fluid additives are known. The commonly used additives include clays, viscosifiers, fluid loss control agents, thinners, lubricants, biocides, surface active agents, weighting materials, flocculants, shale inhibitors, defoamers, caustic, salts, etc. In drilling certain earth formations such as gypsum or other soluble organic salts, or formations containing swelling clays, or also in deep hot wells, a gelatin and/or thickening of the drilling fluid frequently occurs, such that the viscosity of the drilling fluid becomes excessive and there is danger of loosing control of mud properties, of high pump pressure, of slowing the drilling rate, of not passing through screen of shale shaker, of loosing mud circulation, of gas cutting in the mud, or of blowout occurring. For control of rheological flow properties of the drilling fluid, which is the primary concern of this invention, knowledge of the plastic viscosity (PV), yield point (YP), and the gel strengths (Gel) is necessary. The PV/YP ratio characterizes the shear thinning properties of the drilling fluid i.e. the degree to which the effective viscosity declines with increase in rate of shear. Excessively high yield points or gel strengths are reduced by the addition of certain compounds known as thinners. When added to the drilling fluid these thinners reduce flow resistance and gel development. Materials commonly used as thinners for clay-water drilling fluids can be broadly classified as (1) plant tannins, (2) polyphosphates, (3) lignite materials, (4) lignosulfonates, and (5) synthetic polymers.

Numerous drilling fluid additive mixtures comprising various combinations of materials such as lignosulfonates, modified lignosulfonates, lignite, modified lignite, tannins and modified tannins with selected metal compounds [lave been patented. Reference is had to U.S. Pat. Nos. 4,704,214, 4,842,770 and 4,618,433 the disclosures of which are incorporated herein by reference.

While the additive mixtures disclosed in the above mentioned patents have been successfully employed in well drilling operations there is a continuing need to provide a more cost effective additive which is environmentally acceptable.

Accordingly, it is an object of this invention to provide new drilling fluid additives having improved thinning properties.

A more specific object of this invention is to provide an improved drilling fluid having enhanced viscosity or other rheological characteristics.

Another object of this invention is to provide a method of using the improved drilling fluid in the drilling, completion, or workover of wells.

Still another objective of this invention is to provide a method of producing drilling fluid additive blends which are characterized by increased simplicity and efficiency.

Other aspects, objects and advantages of the invention will be apparent to those skilled in the art in view of this disclosure.

SUMMARY OF THE INVENTION

In accordance with this invention a new class of additives for drilling fluid is provided, which additives when incorporated into drilling fluids such as water-based drilling fluids impart improved viscosity or other rheological characteristic to the drilling fluid. The new additives are mixtures of materials comprising modified tannin, modified lignite, lignosulfonate, synthetic polymers prepared from acrylic acid, and metal compounds of the group of metals comprising iron, tin, chromium, manganese, titanium, aluminum and zinc. The phrase "synthetic polymer prepared from acrylic acid" as used herein is intended to cover homopolymers, copolymers and the like which are prepared from acrylic acid and a related monomer which is compatible with water-based drilling fluids, such as methacrylic acid.

A first preferred embodiment of the invention is a combination of additives which includes a modified tannin, a synthetic polymer prepared from acrylic acid and a metal compound selected from the group of metals comprising iron, tin, chromium, manganese, titanium, aluminum and zinc or combinations thereof. A second preferred embodiment of the invention is a combination of additives comprising modified lignite, a metal compound selected from the group of iron, chromium, and tin or combinations thereof and a synthetic polymer prepared from acrylic acid. A third preferred embodiment of this invention is a combination of additives comprising a residue prepared from dry sodium lignosulfonate, a metal compound selected from the group of metals comprising iron, tin, chromium, manganese, titanium, aluminum and zinc or combinations thereof and a synthetic polymer prepared from acrylic acid.

A fourth preferred embodiment of this invention is a combination of additives prepared by blending liquid lignosulfonate, a synthetic polymer prepared from acrylic acid, a metal compound selected from the group of metals comprising iron, tin, chromium, manganese, titanium, aluminum and zinc or combinations thereof, and optionally a caustic soda solution, and then drying the liquid blend to a dry residue and finally grinding the residue to a powder form.

The amount of additive incorporated into the drilling, completion or workover fluid should be an amount sufficient to reduce at least one of the parameters including: (a) viscosity, (b) yield point, or (c) 10 second or 10 minute gel strength.

DETAILED DESCRIPTION OF THE INVENTION

The drilling, completion and workover fluids to which the present invention applies are those conventionally known in the art and encompass water-based muds. Generally the drilling fluids contain finely divided clays such as bentonites, kaolin, or illites and also weighting materials, all suspended in the water. Suitable drilling fluids to which this invention can be applied are disclosed for example in U.S. Pat. No. 3,028,333.

A first component of the additive blends of the present invention is selected from a group that includes a modified tannin, a modified lignite and sodium lignosulfonate. The modified tannin can be a sodium tannin, sulfited tannin or sulfoalkylated tannin. Sulfomethylated quebracho (SMQ) is presently preferred for use as a modified tannin. Any suitable lignite or lignite by-product can be used in this invention. The preferred modified lignite is a lignite which has been pre-treated with alkali bases or "causticized" for improved water solubility. These materials are well known in the art, commercially available and method of preparation for use in drilling fluids is described for example in U.S. Pat. No. 4,704,214, previously incorporated herein by reference.

A second component of the additive blends of this invention is selected from a group including orgasmic homopolymers and copolymers which are known to be useful for thinning of the aqueous fluids. For example a class of purely synthetic petrochemical derivatives of polyacrylates have been formulated which perform well in water-based drilling fluids with elevated levels of calcium and alkaline-metal salts. In these polymers used for improving fluid properties, a molecule or molecules is synthesized for efficient improvement of a specific property, such as deflocculation, where the synthetic molecule can out perform known naturally occurring polymer molecules.

A third and final component of the additive blends of the present invention is a metal compound selected from the group of metals including iron, tin, chromium, manganese., titanium, aluminum and zinc. A metal selected from the preceding group can be used in this invention in a form which is at least partially water soluble. A hydrated sulfate of iron is preferred for use in this invention.

As an alternative to the addition of a specifically formulated adjuvant molecule to a fluid for meeting the specific demands of a drilling fluid system, the physical blending of an established synthetic polymer at optimum ratios with other known thinners and one of the above mentioned metal compounds for improving fluid properties, yields an additive blend which surpasses the properties of the starting components.

Thus in accordance with the first preferred embodiment of this invention an anionic sodium polyacrylate copolymer additive sold by Alco Chemical Corporation, Chattanooga, Tennessee, under the brandname Alcodrill TM HPD-S is blended with a modified tannin which is preferably sulfomethylated quebracho (SMQ) and a hydrated sulfate of iron which is preferably $FeSO_4 \cdot H_2O$. The weight percent of the above identified components which form the useful blends of this invention are shown in Table IA below. For commercial use these components can be blended by any conventional dry blending equipment.

In the second preferred embodiment of this invention the sodium polyacrylate polymer sold under the tradename Alcodrill TM HPD-S is blended with solubilized lignite which is a North Dakota humic acid reacted with caustic soda, available from American Colloid Company, Reeder, N. Dak., hereinafter referred to as Na-Lignite, and a hydrated sulfate of iron which is preferably $FeSO_4 \cdot H_2O$. The weight percent of the above identified components which form the useful blends of this invention are shown in Table IA below. For commercial use these components can be blended by any conventional dry blending equipment.

In the third preferred embodiment of this invention the sodium polyacrylate polymer sold under the tradename Alcodrill TM is mixed with a modified lignosulfonate prepared by drying a quantity of liquid sodium lignosulfonate sold by Georgia Pacific under the brand LIGNOSITE ® 431-H, in an oven at about 120° C. The dry residue is ground and kept in a closed container and is referred to herein as Na-LS. The Alcodrill TM and Na-LS are mixed with an iron compound which is preferably $FeSO_4 \cdot H_2O$. The weight percent of the above identified components which form the useful blends of this invention are shown in Table IA below. For commercial use these components can be blended by any conventional dry blending equipment.

TABLE IA

| Amounts Of Component In The Additive Blends | | |
|---|---|---|
| | Broad Range Weight Percent | Preferred Range Weight Percent |
| [a]First Component | 50 to 90 | 60 to 80 |
| [b]Second Component | 5 to 25 | 10 to 20 |
| [c]Third Component | 5 to 25 | 10 to 20 |

[a]A single additive blend component is selected from a modified tannin, a modified lignite and sodium lignosulfonate.
[b]A single additive blend component is selected from a solid form of polyacrylate homopolymer, and a solid form of polyacrylate copolymer.
[c]A single additive blend component is selected from metal compounds of iron, tin, chromium, manganese, titanium, aluminum and zinc.

In the fourth preferred embodiment of this invention a liquid blend of components is first formed, and then dried to produce a dry residue. The dry residue is then ground to a powder form. The components of the liquid blend include Lignosite 431-H, a sodium polyacrylate polymer sold under the tradename Alcodrill TM HPD-S, a metal compound which is preferably $FeSO_4 \cdot H_2O$ and a caustic soda solution. The weight percent of the above identified components which form the useful blends of this embodiment are shown in Table 1B below. For commercial use the components for forming the liquid blend can be blended by any conventional blending equipment.

TABLE IB

| Amounts of Component in the Dry Residue of the Fourth Embodiment | | |
|---|---|---|
| | Broad Range Weight Percent | Preferred Range Weight Percent |
| LIGNOSITE ® 431-H[a] | 50 to 90 | 60 to 80 |
| Second Component[b] | 5 to 25 | 10 to 20 |
| Third Component[c] | 5 to 25 | 10 to 20 |
| Caustic Soda | 0 to 15 | 0 to 5 |

[a]Liquid form.
[b]See footnote b in Table IA.
[c]See footnote c in Table IA

It will be noted that the additives of this invention are mixtures of components e.g. the first preferred embodiment can comprise a mixture of SMQ, $FeSO_4 \cdot H_2O$ and Alcodrill TM which cooperate to obtain the improved results of the invention. Accordingly the additives cooperate in a synergistic manner to improve the thinning characteristics or other theological property of a drilling fluid having the additive blend incorporated therein. The synergistic effect obtained when using this additive blend is illustrated in connection with the following specific examples.

The following examples will serve to further illustrate the invention. In these examples the additives of this invention were generally tested individually and in combinations with and without the synthetic polymer (Alcodrill TM). The base drilling fluid was prepared in a conventional manner e.g. by mixing 10,000 milliliters of tap water and 470 grams Wyoming bentonite and stirring for 20 minutes at about 10,000 rpm with a suitable blender such as a dispersator, and then adding 2,350 grams of P95 illite clay and stirring for 10 minutes, then adding 5,600 grams of barite and stirring for at least 30 minutes. The prepared drilling fluid was then rolled for at least 24 hours at room temperature prior to use.

EXAMPLE I

This examples compares the effectiveness of an SMQ+$FeSO_4 \cdot H_2O$+polyacrylate polymer blend to SMQ individually, other SMQ blends, and a blend of polyacrylate polymer and $FeSO_4 \cdot H_2O$.

In these tests 412 grams of the drilling fluid was mixed in a suitable container with the additives as listed in Table II to prepare 6 samples which were each stirred for at least 20 minutes on a multi-mixer. The pH of each sample was adjusted to about 10.0 by adding a 50 percent W/V NaOH solution during the stirring period. The fluid samples were then rolled in a preheated roller oven at 80° C. for 2 hours. The samples were then cooled to room temperature, stirred for 2 minutes on the multi-mixer and tested according to API procedure RP-13B. Test results are shown in the "Uncontaminated" column in Table III.

Next each sample was contaminated with 0.8 grams of gypsum and stirred for 10 minutes with the multi-mixer. The pH of all samples was readjusted to about 10.0 by adding the NaOH solution while the samples were stirred for an additional 10 minutes and then tested in accordance with API procedure RP-13B. These test results are shown in the column labeled "Contaminated-Initial" in Table III.

Finally all the samples were aged in a static condition for 16 hours in an oven at 80° C., cooled to room temperature, and stirred for 5 minutes. The pH was readjusted to about 10.0 with the NaOH solution and tested for a third time. The test results are shown under the column labeled "Contaminated-Aged" in Table III.

TABLE II

| Sample Number | Additive Used in Example I |
|---|---|
| (1) | None |
| (2) | 1.6 g SMQ |
| (3) | 1.44 g SMQ & 0.16 g $FeSO_4 \cdot H_2O$ blend |
| (4) | 1.28 g SMQ & 0.32 g Alcodrill TM HPD[a]-S blend |
| (5) | 1.12 g SMQ, 0.16 g $FeSO_4 \cdot H_2O$, & 0.32 g Alcodrill TM HPD[a]-S blend |
| (6) | 0.16 g $FeSO_4 \cdot H_2O$ & 0.32 g Alcodrill TM HPD[a]-S blend |

[a]Alcodrill TM HPD-S is a sodium polyacrylic polymer in solid form.

TABLE III

| | Additives in Uncontaminated, Gypsum Contaminated & Aged Drilling Fluid | | | | | | | | | |
|---|---|---|---|---|---|---|---|---|---|---|
| | Uncontaminated | | | Contaminated-Initial | | | Contaminated-Aged | | | |
| | | Gel Strength | | | Gel Strength | | | Gel Strength | | |
| Sample Number | YP[a] lb/100 Ft$^2$ | 10 Sec lb/100 Ft$^2$ | 10 Min lb/100 Ft$^2$ | YP lb/100 Ft$^2$ | 10 Sec lb/100 Ft$^2$ | 10 Min lb/100 Ft$^2$ | YP lb/100 Ft$^2$ | 10 Sec lb/100 Ft$^2$ | 10 Min lb/100 Ft$^2$ | WL[b] ML/30 Min |
| (1) | 19 | 8 | 48 | 116 | 115 | 125 | 152 | 136 | 159 | 9.3 |
| (2) | 20 | 17 | 45 | 44 | 49 | 82 | 37 | 39 | 83 | 7.2 |
| (3) | 7 | 4 | 16 | 23 | 26 | 67 | 27 | 19 | 65 | 6.6 |
| (4) | 1 | 1 | 2 | 15 | 7 | 58 | 14 | 5 | 55 | 6.8 |
| (5) | 0 | 1 | 1 | 6 | 2 | 14 | 2 | 2 | 20 | 6.7 |
| (6) | 1 | 1 | 2 | 24 | 43 | 120 | 29 | 47 | 99 | 8.0 |

[a]YP represents yield point.
[b]WL represents water loss.

Referring now to Table III these data show that the combination of additive used in sample number 5 reduce the measured values of YP and gel strength compared to the other blends or individual components tested. Accordingly this blend is a highly effective thinning agent for drilling fluids regardless of contamination with gypsum or age conditions.

EXAMPLE II

This examples compares the effectiveness of additive blends in a salt contaminated fluid. The blend comprising SMQ+$FeSO_4 \cdot H_2O$+Alcodrill TM is compared to single component additives of SMQ and Alcodrill TM.

In this test, 9 samples were prepared and tested according to the procedure as follows.

While stirring 412 g of the drilling fluid with a multi-mixer, 0.1 milliliters of a 50 percent W/V NaOH solution was added to each sample and the stirring continued for 10 minutes. Then 0.8 grams of salt (NaCl) was added to each sample and stirred for an additional 10 minutes. Next additives as listed in Table IV were admixed into the drilling fluid samples and stirred for an additional 10 minutes. pH of all samples was adjusted to about 10.2 with the NaOH solution while stirring the samples for another 10 minutes. The samples were then tested in accordance with API procedure RP-13B and results are shown under the "Initial Results" column in Table V. All samples were then rolled in a preheated roller oven at about 80° C. for 16 hours, cooled to room temperature, and then stirred for 5 minutes. pH of all samples was readjusted to about 10.2 with the NaOH solution while stirring. The samples were then retested and results are shown in column labeled "Results After Aging".

TABLE IV

| Sample Number | Additive Used in Example II |
|---|---|
| (1) | None |
| (2) | 1.6 g SMQ |
| (3) | 1.44 g SMQ & 0.16 g FeSO$_4$.H$_2$O blend |
| (4) | 1.28 g SMQ & 0.32 g Alcodrill TM HPD$^a$-S blend |
| (5) | 1.12 g SMQ, 0.16 g FeSO$_4$.H$_2$O, & 0.32 g Alcodrill TM HPD-S blend |
| (6) | 0.40 g Alcodrill TM HPD$^a$-S |
| (7) | 1.28 g SMQ & 0.32 g Alcodrill TM SPD$^b$-S blend |
| (8) | 1.12 g SMQ, 0.16 g FeSO$_4$.H$_2$O, & 0.32 g Alcodrill TM SPD$^b$-S blend |
| (9) | 0.40 g Alcodrill TM SPD$^b$-S |

$^a$Alcodrill TM HPD-S is a sodium acrylic copolymer in solid form.
$^b$Alcodrill TM SPD-S is a sodium acrylic polymer in solid form.

TABLE V

Additives in Salt Contaminated Drilling Fluid

| | Initial Results | | | Results After Aging | | |
|---|---|---|---|---|---|---|
| | | Gel Strength | | | Gel Strength | |
| Sample Number | YP$^a$ lb/100 Ft$^2$ | 10 Sec lb/100 Ft$^2$ | 10 Min lb/100 Ft$^2$ | YP lb/100 Ft$^2$ | 10 Sec lb/100 Ft$^2$ | 10 Min lb/100 Ft$^2$ |
| (1) | 118 | 91 | 102 | 109 | 138 | 263 |
| (2) | 32 | 40 | 87 | 37 | 41 | 82 |
| (3) | 7 | 2 | 33 | 16 | 8 | 49 |
| (4) | 4 | 2 | 31 | 8 | 2 | 28 |
| (5) | 2 | 1 | 2 | 2 | 2 | 4 |
| (6) | 11 | 8 | 46 | 9 | 2 | 24 |
| (7) | 12 | 11 | 44 | 15 | 6 | 53 |
| (8) | 1 | 1 | 3 | 6 | 2 | 7 |
| (9) | 22 | 29 | 59 | 12 | 6 | 38 |

$^a$YP represents yield point.

Referring now to Table V these data show that the combination of additives used in sample number 5 using a polyacrylate copolymer and sample number 8 using polyacrylate polymer significantly reduce the YP and gel strength values compared to the other blends and components tested. Accordingly these blends are each highly effective agents in a drilling fluid, and in which the additive blends retain their effectiveness after aging in a salt contaminated drilling fluid.

EXAMPLE III

This example compares the effectiveness of additive blends including SMQ+Alcodrill TM HPD+tin, and SMQ+Alcodrill TM + tin, to a single component of additive SMQ, Alcodrill TM SPD and a Alcodrill TM HPD.

Using the same test procedure as for Example II for the additives as shown in Table VI, the results of Table VII were obtained.

TABLE VI

| Sample Number | Additive Used in Example III |
|---|---|
| (1) | None |
| (2) | 1.6 g SMQ |
| (3) | 1.52 g SMQ & 0.08 g SnSO$_4$ blend |
| (4) | 1.28 g SMQ & 0.32 g Alcodrill TM HPD-S blend |
| (5) | 1.20 g SMQ, 0.08 g SnSO$_4$, & 0.32 g Alcodrill TM HPD-S blend |
| (6) | 0.40 g Alcodrill TM HPD-S |
| (7) | 1.28 g SMQ & 0.32 Alcodrill TM SPD-S blend |
| (8) | 1.20 g SMQ, 0.08 g SnSO$_4$, & 0.32 g Alcodrill TM SPD-S blend |
| (9) | 0.40 g Alcodrill TM SPD-S |

TABLE VII

Additives in Salt Contaminated Drilling Fluid

| | Initial Results | | | Results After Aging | | |
|---|---|---|---|---|---|---|
| | | Gel Strength | | | Gel Strength | |
| Sample Number | YP$^a$ lb/100 Ft$^2$ | 10 Sec lb/100 Ft$^2$ | 10 Min lb/100 Ft$^2$ | YP lb/100 Ft$^2$ | 10 Sec lb/100 Ft$^2$ | 10 Min lb/100 Ft$^2$ |
| (1) | 118 | 91 | 102 | 109 | 138 | 263 |
| (2) | 32 | 40 | 87 | 37 | 41 | 82 |
| (3) | 14 | 11 | 45 | 6 | 2 | 23 |
| (4) | 4 | 2 | 31 | 8 | 2 | 28 |
| (5) | 4 | 2 | 7 | 4 | 1 | 3 |
| (6) | 11 | 8 | 46 | 9 | 2 | 24 |
| (7) | 12 | 11 | 44 | 15 | 6 | 53 |
| (8) | 6 | 2 | 22 | 4 | 2 | 6 |
| (9) | 22 | 29 | 59 | 12 | 6 | 38 |

$^a$YP represents yield point.

Referring now to Table VII these data show that the combination of additives in sample number 5 using a polyacrylate copolymer and in sample number 8 using a polyacrylate polymer each significantly reduced the YP and gel values compared to the other blends and components of the blends tested. Accordingly these blends are highly effective agents in salt contaminated drilling fluids and further these blends retain their effectiveness after aging in the salt contaminated fluid.

EXAMPLE IV

This example compares effectiveness of additive blends including Na-Lignite+FeSO$_4$.H$_2$O+polyacrylate polymers to a single component additives of Na-Lignite and the polyacrylate polymers.

Using the same test procedures in Example II for the additives shown in Table VIII the results of Table IX were obtained.

TABLE VIII

| Sample Number | Additive Used in Example IV |
|---|---|
| (1) | None |
| (2) | 1.6 g Na-Lignite |
| (3) | 1.44 g Na-Lignite & 0.16 g FeSO$_4$.H$_2$O blend |
| (4) | 1.28 g Na-Lignite & 0.32 g Alcodrill TM HPD-S blend |
| (5) | 1.12 g Na-Lignite, 0.16 g FeSO$_4$.H$_2$O, & 0.32 g Alcodrill TM HPD-S blend |
| (6) | 0.40 g Alcodrill TM HPD-S |

TABLE IX

Additives in Salt Contaminated Drilling Fluid

| | Initial Results | | | Results After Aging | | |
|---|---|---|---|---|---|---|
| | | Gel Strength | | | Gel Strength | |
| Sample Number | YP$^a$ lb/100 Ft$^2$ | 10 Sec lb/100 Ft$^2$ | 10 Min lb/100 Ft$^2$ | YP lb/100 Ft$^2$ | 10 Sec lb/100 Ft$^2$ | 10 Min lb/100 Ft$^2$ |
| (1) | 118 | 91 | 102 | 109 | 138 | 263 |
| (2) | 26 | 38 | 74 | 30 | 41 | 72 |

TABLE IX-continued

| | Additives in Salt Contaminated Drilling Fluid | | | | | |
|---|---|---|---|---|---|---|
| | Initial Results | | | Results After Aging | | |
| | | Gel Strength | | | Gel Strength | |
| Sample Number | YP[a] lb/100 Ft$^2$ | 10 Sec lb/100 Ft$^2$ | 10 Min lb/100 Ft$^2$ | YP lb/100 Ft$^2$ | 10 Sec lb/100 Ft$^2$ | 10 Min lb/100 Ft$^2$ |
| (3) | 23 | 41 | 119 | 28 | 41 | 88 |
| (4) | 7 | 3 | 47 | 9 | 3 | 34 |
| (5) | 5 | 2 | 37 | 8 | 2 | 29 |
| (6) | 11 | 8 | 46 | 9 | 2 | 24 |

[a]YP represents yield point.

Referring now to Table IX these data show that the combination additives in sample number 5 significantly reduced the measured values of YP and gel strength. Accordingly this blend is a highly effective thinning agent for drilling fluids which retains its effectiveness after aging in a salt contaminated drilling fluid.

EXAMPLE V

This example compares the effectiveness of the additive blends including Na-LS+FeSO$_4$.H$_2$O+Alcodrill TM and blends of Na-LS, SnSO$_4$ and Alcodrill TM to a single component additive of Na-LS and blends of Na-LS with FeSO$_4$.H$_2$O and Na-LS with SnSO$_4$.

For the preparation of Na-LS, 200 grams of LIGNOSITE® 431-H which is approximately 50 percent by weight sodium lignosulfonate in water, was placed in a porcelain dish and dried at 120° C. in an oven. The dry residue was ground and kept in a closed container.

In these tests 412 grams of the drilling fluid was placed in each of 6 suitable sample container and 0.8 grams of NaCl was added to each sample while stirring the sample, with stirring continued for 10 minutes after addition of the salt. Next the additives as listed in Table X were respectively admixed into the drilling fluid samples and stirring continued for an additional 20 minutes. The pH of all samples was adjusted to about 9.0 by admixing the 50% W/V NaOH solution during the stirring period. The samples were then tested in accordance with API procedure RP-13B immediately after stirring, and the test results are shown under the column labeled "Initial Results" in Table XI. All samples were then aged under static conditions for 16 hours in an oven at about 80° C. Next the samples were cooled to room temperature, stirred for 5 minutes and retested. These test results are shown under the column "Results After Aging" in Table XI.

TABLE X

| Sample Number | Additive Used in Example V |
|---|---|
| (1) | 1.6 g Na-LS |
| (2) | 1.44 g Na-LS & 0.16 g FeSO$_4$.H$_2$O blend |
| (3) | 1.28 g Na-LS & 0.32 g Alcodrill TM HPD-S blend |
| (4) | 1.12 g Na-LS, 0.16 g FeSO$_4$.H$_2$O, & 0.32 Alcodrill TM HPD-S blend |
| (5) | 1.44 g Na-LS & 0.16 g SnSO$_4$ blend |
| (6) | 1.12 G Na-LS, 0.16 g SnSO$_4$, & 0.32 g Alcodrill TM HPD-S blend |

TABLE XI

| | Additives in Salt Contaminated Drilling Fluid | | | | | |
|---|---|---|---|---|---|---|
| | Initial Results | | | Results After Aging | | |
| | | Gel Strength | | | Gel Strength | |
| Sample Number | YP[a] lb/100 Ft$^2$ | 10 Sec lb/100 Ft$^2$ | 10 Min lb/100 Ft$^2$ | YP lb/100 Ft$^2$ | 10 Sec lb/100 Ft$^2$ | 10 Min lb/100 Ft$^2$ |
| (1) | 74 | 59 | 68 | 46 | 37 | 68 |
| (2) | 47 | 52 | 79 | 53 | 43 | 63 |
| (3) | 19 | 23 | 75 | 20 | 6 | 47 |
| (4) | 12 | 12 | 63 | 14 | 7 | 44 |
| (5) | 23 | 44 | 101 | 28 | 30 | 57 |
| (6) | 17 | 18 | 81 | 12 | 3 | 32 |

[a]YP represents yield point.

Referring now to Table XI, these data show that the combination additives in sample number 4 and sample number 6 significantly reduce measured values of YP and gel strength. Accordingly these blends are highly effective drilling fluid agents for salt contaminated drilling fluids and these blends retain their effectiveness after aging.

EXAMPLE VI

This example compares the effectiveness of additive blends prepared by premixing components of blends with water and drying the liquid blends prior to admixing the additive blends into the drilling fluid.

In this example four Na-LS additive blends were prepared as follows:

Na-LS #1. In a suitable glass container, 45 grams of LIGNOSITE ®431-H, 2.5 ml of deionized water, and 2.5 grams of FeSO$_4$.H$_2$O were well mixed. After mixing the container was closed and heated in an oven at a temperature of 60° C. for about 2 hours. This liquid mixture was placed in a porcelain dish and dried in an oven at 120° C. The dry residue was then ground.

Na-LS #2. In a suitable glass container, 45 grams of LIGNOSITE ® 431-H, 2.5 ml of deionized water and 2.5 grams of Alcodrill TM HPD-S were well mixed. After mixing the container was closed and heated in an oven at 60° C. for about 1 hour. This liquid mixture was placed in a porcelain dish and dried in an oven at 120° C. The dry residue was then ground.

Na-LS #3. In a suitable glass container, 40 grams of LIGNOSITE ® 431-H, 5 ml of deionized water, 2.5 grams of FeSO$_4$.H$_2$O and 2.5 grams of Alcodrill TM HPD-S were well mixed. After mixing the container was closed and heated in an oven at 60° C. for about 1 hour. The liquid mixture was then placed in a porcelain dish and dried in an oven at 120° C. The dry residue was then ground.

Na-LS #4. In a suitable glass container, 40 grams of LIGNOSITE ® 431-H, 5 ml of deionized water, 2.5 grams of FeSO$_4$.H$_2$O, 3.0 grams of 50 percent W/V NaOH solution and 2.5 grams Alcodrill TM HPD-S were well mixed. After mixing the container was closed and heated in an oven at 60° C. for about 2 hours. The liquid mixture was then placed in a porcelain dish and dried in an oven at 120° C. The dry residue was then ground.

Using the same test procedure as for Example V, for the additive components shown in Table XII, the results of Table XIII were obtained.

TABLE XII

| Sample Number | Additive Used in Example VI |
|---|---|
| (1) | 3.2 g Na-LS |
| (2) | 3.2 g Na-LS #1 |
| (3) | 3.2 g Na-LS #2 |
| (4) | 3.2 g Na-LS #3 |
| (5) | 3.2 g Na-LS #4 |

TABLE XIII

Additives in Salt Contaminated Drilling Fluid

| | Initial Results | | | Results After Aging | | |
|---|---|---|---|---|---|---|
| | | Gel Strength | | | Gel Strength | |
| Sample Number | YP$^a$ lb/100 Ft$^2$ | 10 Sec lb/100 Ft$^2$ | 10 Min lb/100 Ft$^2$ | YP lb/100 Ft$^2$ | 10 Sec lb/100 Ft$^2$ | 10 Min lb/100 Ft$^2$ |
| (1) | 88 | 58 | 70 | | Not Tested | |
| (2) | 23 | 31 | 58 | 43 | 35 | 53 |
| (3) | 23 | 32 | 71 | 29 | 19 | 52 |
| (4) | 13 | 8 | 50 | 27 | 16 | 47 |
| (5) | 8 | 2 | 33 | 14 | 4 | 35 |

$^a$YP represents yield point.

Referring now to Table XIII these data show lower yield point and gel values for the combination additives in samples numbers 4 and 5, which evidences highly effective thinning agents for salt contaminated drilling fluids. Further these data show that the blends retain their effectiveness after aging in a salt contaminated drilling fluid.

EXAMPLE VII

In this example the sodium-lignosulfonate additive blends prepared in Example VI are tested in an uncontaminated drilling fluid.

In this test sample quantities of 412 grams of the drilling fluid were placed in each of five suitable containers. While stirring samples with a multi-mixer, additives were admixed as listed in Table XIV and the stirring continued for 20 minutes. The pH of all samples was adjusted to about 9.5 by adding a 50 percent W/V NaOH solution during the stirring period. The samples were tested in accordance with API testing procedure RP-13B immediately after stirring. Test results are shown under the columns labeled "Initial Results" in Table XV. Next all samples were aged under static condition for 16 hours in an oven maintained at a temperature of 80° C. The samples were then cooled to room temperature, stirred for 5 minutes and retested. Test results are shown in the column labeled "Results After Aging" in Table XV.

TABLE XIV

| Sample Number | Additive Used in Example VII |
|---|---|
| (1) | None |
| (2) | 0.8 g Na-LS |
| (3) | 0.8 g Na-LS #2 |
| (4) | 0.8 g Na-LS #3 |
| (5) | 0.8 g Na-LS #4 |

TABLE XV

Additives Blends Containing Sodium Lignosulfonate

| | Initial Results | | | Results After Aging | | |
|---|---|---|---|---|---|---|
| | | Gel Strength | | | Gel Strength | |
| Sample Number | YP$^a$ lb/100 Ft$^2$ | 10 Sec lb/100 Ft$^2$ | 10 Min lb/100 Ft$^2$ | YP lb/100 Ft$^2$ | 10 Sec lb/100 Ft$^2$ | 10 Min lb/100 Ft$^2$ |
| (1) | 21 | 17 | 57 | 23 | 20 | 57 |
| (2) | 26 | 36 | 56 | 23 | 28 | 52 |
| (3) | 11 | 7 | 39 | 11 | 3 | 26 |
| (4) | 8 | 4 | 42 | 15 | 4 | 32 |
| (5) | 5 | 2 | 23 | 10 | 3 | 23 |

$^a$YP represents yield point.

Referring now to Table XV these data show lower YP and gel values with a combination of additives in sample number 5, compared to the single component additives in sample number 2. Further these data show that the additive blend retain their effectiveness after aging.

The aqueous drilling fluids containing the thinning additive blends of this invention in water-based drilling fluids can contain other additives when required to adjust the property of the drilling fluids in accordance with conventional practice. Thus it will be understood that other additives can be present in a drilling fluid of this invention without departing from the scope of this invention.

While certain embodiments of this invention have been described for illustrative purposes, the invention is obviously not limited thereto, since various modification will be apparent to those skilled in the art in view of the disclosure. Such modifications are within the spirit and scope of the claimed invention.

That which is claimed is:

1. A composition suitable for use as an additive in drilling, completion or workover fluids, said composition including a blend of chemical components consisting of:
   a first component selected form the group including:
   (a) a modified tannin, selected from the group consisting of a causticized tannin, a sulfited tannin, a sulfoalkylated tannin, and combination thereof,
   (b) a lignite, and
   (c) a lignosulfonate:
   a second component comprising a polymer prepared using acrylic acid; and a third component comprising a metal compound wherein said metal is selected from the group of metals including iron, tin, manganese, titanium aluminum and zinc or combinations thereof.

2. A composition in accordance with claim 1, wherein said first component is present in said blend in an amount from about 50 weight percent to about 90 weight percent.

3. A composition in accordance with claim 1, wherein said second component and said third component are each present in said blend in an amount from about 5 to about 25 weight percent.

4. A composition in accordance with claim 1, wherein said modified tannin is sulfoalkylated quebracho, said lignite is sulfoalkylated lignite; and said polymer is selected from the group comprising a homopolymer and a copolymer of sodium polyacrylate.

5. A composition in accordance with claim 1, wherein said third component comprising a metal compound is in a form which is at least partially water soluble.

6. A composition in accordance with claim 1, wherein said first component comprises sulfomethylated quebracho, said second component comprises a copolymer of sodium polyacrylate, said third component comprises $FeSO_4.H_2O$.

7. A composition in accordance with claim 1, wherein said modified tannin is a causticized tannin and said lignite is a causticized lignite.

8. A composition in accordance with claim 1, wherein said modified tannin is a sulfited quebracho extract and said lignite is a sodium salt of sulfonated lignite.

9. An aqueous based composition for use as a drilling, completion or workover fluid comprising water and sufficient finely divided solids to form a filter cake on the wall of a well, to which there has been added a thinning improvement amount of a blend of chemical components, said blend consisting of:
   a first component selected from the group including:
      (a) a modified tannin, selected from the group consisting of a causticized tannin, a sulfited tannin, a sulfoalkylated tannin, and combinations thereof,
      (b) a lignite, and
      (c) a lignosulfonate;
   a second component comprising a polymer prepared using acrylic acid; and
   a third component comprising a metal compound wherein said metal is selected from the group of metals including iron, tin, manganese, titanium, aluminum and zinc.

10. A composition in accordance with claim 9, wherein said blend is present in an amount sufficient to reduce at least one of the parameters of said fluid including:
   (a) viscosity,
   (b) yield point, and
   (c) gel strength.

11. A composition in accordance with claim 10, wherein said modified tannin is sulfoalkylated quebracho, said lignite is sulfoalkylated lignite and said polymer is selected from the group comprising a homopolymer and a copolymer of sodium polyacrylate.

12. A method of drilling a bore hole in the earth of the type wherein the bore hole is formed by drilling means using a hollow drill string penetrating the earth to the bottom of said bore hole comprising circulating a drilling fluid composition wherein said composition consisting of:
   a first component selected from the group including:
      (a) a modified tannin,
      (b) a lignite, and
      (c) a lignosulfonate:
   a second component comprising a polymer prepared using acrylic acid; and
   a third component comprising a metal compound wherein said metal is selected from the group of metals including iron, tin, manganese, titanium, aluminum and zinc;
   wherein said modified tannin is selected from the group consisting of a causticized tannin, a sulfited tannin, a sulfoalkylated tannin, and combinations thereof.

13. A composition in accordance with claim 1, wherein said fist component is dissolved sodium lignosulfonate.

14. A method for producing a dry residue composition suitable for use as an additive in drilling, completion or workover fluids, said method comprising the following step performed in the sequence set forth:
   (a) blending effective amounts of the following components sufficient to form a liquid blend:
      (i) dissolved sodium lignosulfonate,
      (ii) a polymer prepared using acrylic acid, and
      (iii) a metal compound selected from the group of metals including iron, tin, manganese, titanium, aluminum and zinc or mixtures thereof; and
   (b) drying said liquid blend to form said dry residue composition.

15. A method in accordance with claim 14, wherein said liquid blend additionally includes a caustic soda.

16. A method in accordance with claim 14, wherein said liquid sodium lignosulfonate is present in said liquid blend in an amount from about 50 to about 90 weight percent, said polymer is present in said liquid blend in an amount from about 5 to about 25 weight percent, and said metal compound is present in said liquid blend in an amount from about 5 to about 25 weight percent.

17. A method in accordance with claim 15, wherein said caustic soda is present in said liquid blend in an amount from about 0. 1 to about 5 weight percent.

18. A method in accordance with claim 14, additionally comprising the following step:
   grinding said dry residue to a powder form.

19. A method in accordance with claim 15, additionally comprising the following step:
   grinding said dry mixture to a powder form.

20. A method in accordance with claim 18, wherein said powder is added to said drilling, completion or workover fluid in an amount sufficient to reduce at least one of the parameters of said fluid including:
   (a) viscosity,
   (b) yield point, and
   (c) gel strength.

21. A method in accordance width claim 19, wherein said powder is added to said drilling, completion or workover fluid in an amount sufficient to reduce at least one of the parameters of said fluid including:
   (a) viscosity,
   (b) yield point, and
   (c) gel strength.

* * * * *

UNITED STATES PATENT AND TRADEMARK OFFICE
CERTIFICATE OF CORRECTION

PATENT NO.   : 5,399,548

DATED        : March 21, 1995

INVENTOR(S)  : Bharat B. Patel and Wayne S. Stewart

It is certified that error appears in the above-identified patent and that said Letters Patent is hereby corrected as shown below:

On title page, item [75] add Wayne S. Stewart:

Column 12, line 42, the word "combination" should read ---combinations---.

Signed and Sealed this

Sixth Day of June, 1995

*Attest:*

BRUCE LEHMAN

*Attesting Officer*    *Commissioner of Patents and Trademarks*